US008996879B2

(12) United States Patent
Poornachandran et al.

(10) Patent No.: US 8,996,879 B2
(45) Date of Patent: Mar. 31, 2015

(54) USER IDENTITY ATTESTATION IN MOBILE COMMERCE

(75) Inventors: Rajesh Poornachandran, Beaverton, OR (US); Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 12/977,981

(22) Filed: Dec. 23, 2010

(65) Prior Publication Data

US 2012/0167188 A1    Jun. 28, 2012

(51) Int. Cl.
| | |
|---|---|
| G06F 21/32 | (2013.01) |
| H04L 29/06 | (2006.01) |
| H04W 12/06 | (2009.01) |
| G06Q 30/06 | (2012.01) |
| G06Q 20/10 | (2012.01) |
| G06Q 20/32 | (2012.01) |
| G06Q 20/40 | (2012.01) |

(52) U.S. Cl.
CPC ............ *G06F 21/32* (2013.01); *H04L 63/0853* (2013.01); *H04W 12/06* (2013.01); *G06Q 30/0609* (2013.01); *G06Q 20/108* (2013.01); *G06Q 20/3221* (2013.01); *G06Q 20/3227* (2013.01); *G06Q 20/4012* (2013.01); *G06Q 20/40145* (2013.01)
USPC ................... 713/186; 713/185; 726/1; 726/9

(58) Field of Classification Search
CPC .... H04L 63/0861; H04L 9/0863; G06F 21/32
USPC ...................... 726/7; 713/185, 186
See application file for complete search history.

(56) References Cited

U.S. PATENT DOCUMENTS

| | | | | |
|---|---|---|---|---|
| 6,317,544 | B1* | 11/2001 | Diehl et al. ................... | 385/115 |
| 6,633,846 | B1* | 10/2003 | Bennett et al. ................ | 704/257 |
| 2003/0095689 | A1* | 5/2003 | Vollkommer et al. ........ | 382/117 |
| 2003/0115490 | A1* | 6/2003 | Russo et al. .................. | 713/202 |
| 2004/0257196 | A1* | 12/2004 | Kotzin ........................ | 340/5.52 |
| 2005/0220326 | A1* | 10/2005 | Sim .............................. | 382/118 |

(Continued)

FOREIGN PATENT DOCUMENTS

| | | |
|---|---|---|
| JP | 2003233804 A | 8/2003 |
| JP | 2005149256 A | 6/2005 |

(Continued)

OTHER PUBLICATIONS

International Search Report and Written Opinion received for PCT Application PCT/US2011/064897 mailed on Aug. 14, 2012, 10 Pages.

(Continued)

*Primary Examiner* — Jung Kim
*Assistant Examiner* — Thomas Ho
(74) *Attorney, Agent, or Firm* — Barnes & Thornburg LLP

(57) ABSTRACT

A method, apparatus, system, and computer program product for user identity attestation in mobile commerce. The method may include obtaining a photograph of a user of a mobile device via a camera integrated with the mobile device; identifying a first set of fiducial points from the photograph; causing the first set of fiducial points from the photograph to be compared to a second set of fiducial points associated with an authorized user of the mobile device; and determining that the user is the authorized user if the first set of fiducial points matches the second set of fiducial points.

24 Claims, 3 Drawing Sheets

(56) References Cited

U.S. PATENT DOCUMENTS

| | | | |
|---|---|---|---|
| 2006/0013446 A1* | 1/2006 | Stephens | 382/115 |
| 2007/0009139 A1* | 1/2007 | Landschaft et al. | 382/115 |
| 2007/0186106 A1* | 8/2007 | Ting et al. | 713/168 |
| 2007/0253604 A1 | 11/2007 | Inoue et al. | |
| 2009/0175512 A1 | 7/2009 | Hyuga et al. | |
| 2010/0082982 A1 | 4/2010 | Suzuki et al. | |
| 2010/0207721 A1 | 8/2010 | Nakajima et al. | |
| 2011/0069839 A1 | 3/2011 | Tsuruoka et al. | |

FOREIGN PATENT DOCUMENTS

| | | |
|---|---|---|
| JP | 2007067849 A | 3/2007 |
| JP | 2007135149 A | 5/2007 |
| JP | 2009163555 A | 7/2009 |
| JP | 2009211407 A | 9/2009 |
| JP | 2009282598 A | 12/2009 |
| KR | 10-2005-0045773 A | 5/2005 |
| WO | 2008114390 A1 | 9/2008 |
| WO | 2012/087708 A2 | 6/2012 |
| WO | 2012/087708 A3 | 10/2012 |

OTHER PUBLICATIONS

Campadelli et al., "Fiducial point localization in color images of face foregrounds", Image and Vision Computing, Sep. 20, 2004, Volume. 22, Issue 11, pp. 863-872.

International Preliminary Report on Patentability received for PCT Patent Application No. PCT/US2011/064897, mailed on Jul. 4, 2013, 7 pages.

Office Action received for Japanese Patent Application No. 2013-543416, mailed Jun. 3, 2014, 13 pages of Office Action including 7 pages of unofficial English translation.

* cited by examiner

USER IDENTITY ATTESTATION IN MOBILE COMMERCE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to user identity attestation in mobile commerce.

BACKGROUND

With the proliferation of mobile devices in today's society, applications running in mobile computing environments are increasing in number and sophistication. Mobile devices are now being used to process highly sensitive transactions such as financial/banking transactions, health and wellness monitoring, payment processing, and social networking. However, mobile computing devices suffer some disadvantages in supporting the security of these transactions, including a small form factor that limits the computing resources, storage, and battery life available. The computational resources to support sophisticated cryptographic functionality may be excessive for ensuring the security of transactions on a mobile device. Similarly, the multiple handshake transactions for user and/or device attestation may be overly complicated to implement via the networks available to most mobile devices.

DETAILED DESCRIPTION

Figure 1:
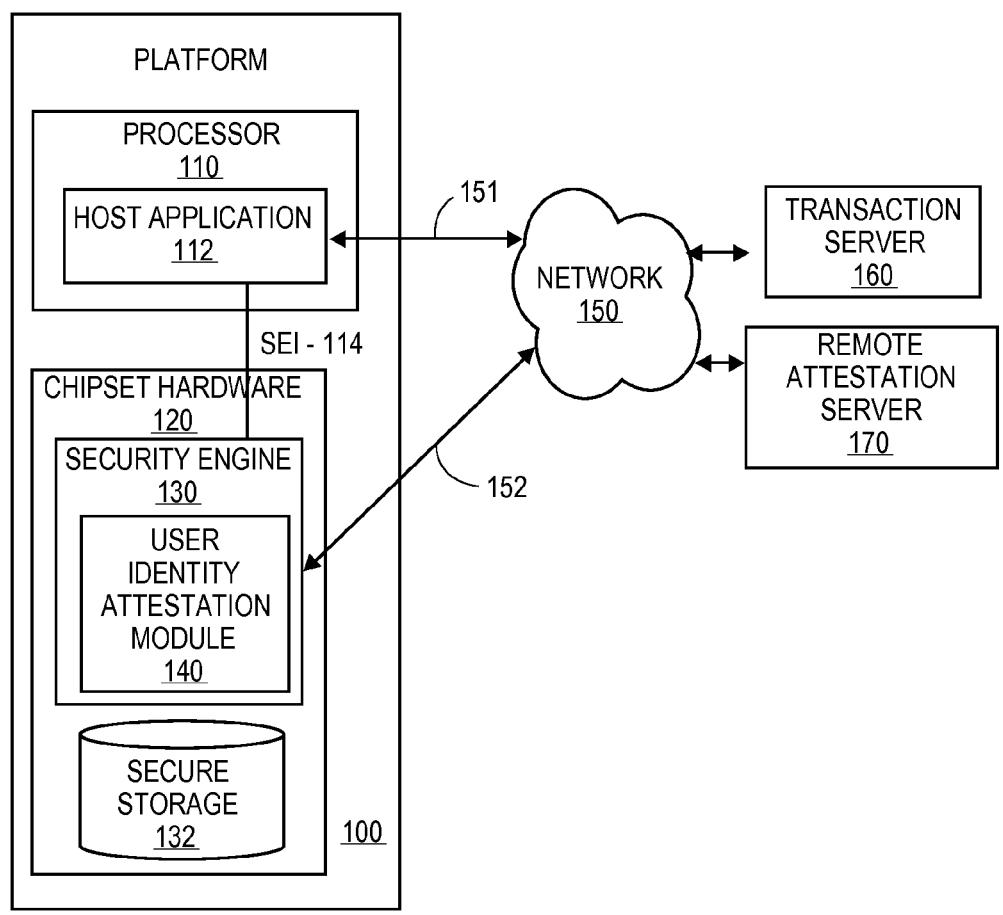
FIG. 1 is a block diagram of a system configured to enable user identity attestation in accordance with one embodiment of the invention.

Embodiments of the present invention may provide a method, apparatus, system, and computer program product for performing user identity attestation in mobile commerce. In one embodiment, the method includes obtaining a photograph of a user of a mobile device via a camera integrated with the mobile device. The method further includes identifying a first set of fiducial points from the photograph and causing the first set of fiducial points from the photograph to be compared to a second set of fiducial points associated with an authorized user of the mobile device. The method further includes determining that the user is the authorized user if the first set of fiducial points matches the second set of fiducial points.

Identifying the first set of fiducial points from the photograph may be performed in a secure partition of the mobile device, wherein the secure partition is isolated from an operating system for the mobile device. The second set of fiducial points may be a shared secret between secure storage on the mobile device and a server remote from the mobile device, wherein the secure storage is isolated from an operating system for the mobile device.

The method may further include obtaining first biometric data from the user of the mobile device, wherein determining that the user is the authorized user further comprises determining that the first biometric data from the user matches second biometric data associated with the authorized user of the mobile device. Causing the first set of fiducial points to be compared to the second set of fiducial points may include sending the first set of fiducial points to a server remote from the mobile device. Causing the first set of fiducial points to be compared to the second set of fiducial points may include providing the first set of fiducial points to a secure partition of the mobile device, wherein the secure partition is isolated from an operating system for the mobile device.

The method may further include using network bandwidth and/or a policy to determine whether to compare the first set of fiducial points to the second set of fiducial points locally or at a server remote from the mobile device. The method may further include authorizing a transaction requested by the user if the user is determined to be the authorized user. The method may further include denying a transaction requested by the user if the user is not determined to be the authorized user.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

FIG. 1 is a block diagram of a system configured to perform user identity attestation in accordance with one embodiment of the invention. Platform 100, which corresponds to a mobile computer system and/or mobile telephone, includes a processor 110 connected to a chipset 120. Processor 110 provides processing power to platform 100 and may be a single-core or multi-core processor, and more than one processor may be included in platform 100. Processor 110 may be connected to other components of platform 100 via one or more system buses, communication pathways or mediums (not shown). Processor 110 runs host applications such as host application 112, which communicates via interconnection 151 through network 150 to transaction server 160. Host application 112 runs under the control of a host operating system (not shown).

Chipset 120 includes a security engine 130, which may be implemented as an embedded microprocessor that operates independently of processor 110, to manage the security of platform 100. Security engine 130 provides cryptographic operations and other user identity attestation functionality. In one embodiment, processor 110 operates under the direction of a host operating system (not shown), whereas security engine 130 provides a secure and isolated environment that cannot be accessed by the host operating system. This secure environment is referred to herein as a secure partition. The secure environment also includes secure storage 132.

In one embodiment, a user identity attestation module 140 running in security engine 130 is used by host application 112 to provide user identity attestation. Host application 112 requests services of security engine 130, including user identity attestation, via security engine interface (SEI) 114. User identity attestation module 140 may be implemented as firmware executed by security engine 130.

Communication between security engine 130 and remote attestation server 170 occurs via out-of-band communication channel 152. In one embodiment, out-of-band communication channel 152 is a secure communication channel between security engine 130 on the host system and remote attestation server 170. Out-of-band communication channel 152 enables security engine 130 to communicate with external servers independently of the host operating system of platform 100.

Figure 2:
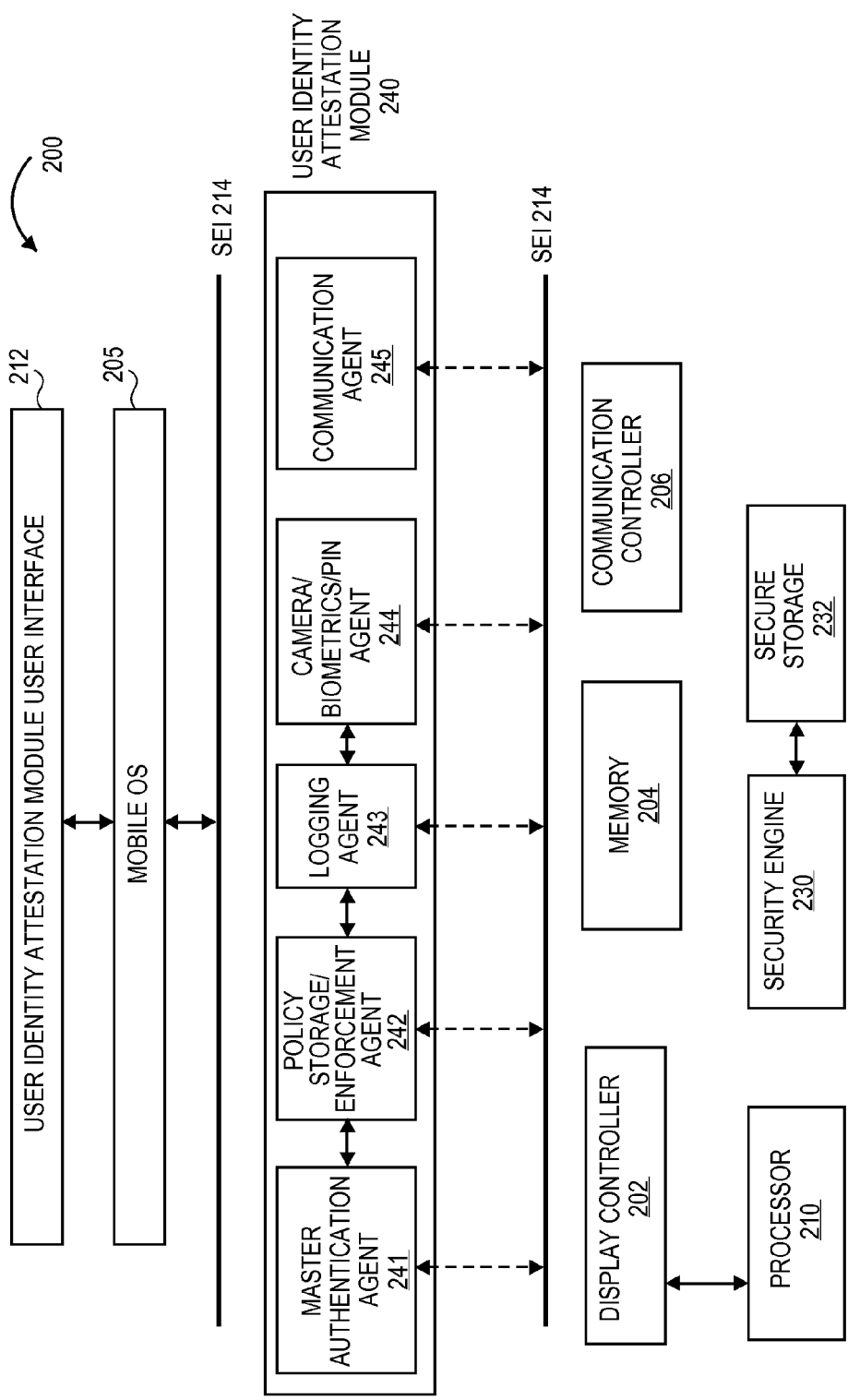
FIG. 2 is a detailed block diagram of the system of FIG. 1 in accordance with one embodiment of the invention.

FIG. 2 shows a more detailed view of the components of the system of FIG. 1. In the embodiment shown in FIG. 2, a user identity attestation module user interface 212 is a host application running in the environment provided by mobile operating system (OS) 205. User identity attestation module user interface 212 calls user identity attestation module 240 to provide attestation of a user's identity. The interaction between user identity attestation module user interface 212 and user identity attestation module 240 is implementation-specific and may occur directly or via the mobile OS 205.

Because user identity attestation module 240 runs within Security Engine 230, user identity attestation module 240 is accessed via Security Engine Interface (SEI) 214. User identity attestation module 240 contains several sub-modules, including master authentication agent 241, policy storage/enforcement agent 242, logging agent 243, Camera/Biometrics/PIN agent 244, and communication agent 245.

Master authentication agent 241 coordinates the overall user identity attestation process. Master authentication agent 241 invokes other sub-modules of user identity attestation module 240 on an as-needed basis depending upon the type of transaction and policies associated with the transaction. When the user accesses a resource that requires user identity attestation, such as a banking, stock, health, or social networking resource, master authentication agent 241 invokes user identity attestation module user interface 212 to obtain the user's credentials. Depending upon the type of transaction, master authentication agent 241 may cause user identity attestation module user interface 212 to request different types of credentials, such as a photograph, biometric data including fingerprints, or a PIN or password. Depending upon the type of data obtained, different functionality of Camera/Biometrics/PIN agent 244 is invoked. Camera/Biometrics/PIN agent 244 runs within security engine 230, which is isolated from mobile OS 205. The functionality of Camera/Biometrics/PIN agent 244 is described in further detail below with reference to FIG. 3.

When a user accesses a resource using the mobile device, master authentication agent 241 also invokes policy storage/enforcement agent 242 to retrieve policy settings from secure storage 232. Examples of policy settings are a type of authentication required for the type of resource and/or transaction requested by the user. For example, a user's initial login to use the mobile device might require only local confirmation of a password or PIN, whereas a request to transfer money from a bank account may require facial recognition to confirm the identity of the user as the owner of the bank account. In one embodiment, these policy settings are configurable. Policy settings may be initialized by the original equipment manufacturer (OEM) of the mobile device and adjusted by an owner of the mobile device and/or by a service provider. For example, when an application is installed on the mobile device, the service provider for the application may require a certain policy be followed for user authentication in order to use the application.

When the user initiates a transaction, master authentication agent 241 invokes logging agent 243 to log the transaction in accordance with policy rules as configured for the mobile device. For example, the user or a service provider may configure the mobile device to require high security transactions, such as transfers of money from bank accounts, to keep a record of the user identity information provided by the user in addition to transaction details such as time of initiation, location, and channel used for communication.

When a transaction involves a remote server such as transaction server 160 and/or remote attestation server 170 of FIG. 1, master authentication agent 241 invokes communication agent 245 to establish a secure communication channel with the remote server.

Platform 200 further includes memory devices such as memory 204 and secure storage 232. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Secure storage 232 may include mass storage devices such as integrated drive electronics (IDE) hard drives, and/or other devices or media, such as floppy disks, optical storage, tapes, flash memory, memory sticks, digital video disks, biological storage, etc. In one embodiment, secure storage 232 is eMMC NAND flash memory embedded within chipset 220, which is isolated from mobile OS 205.

Processor 210 may also be communicatively coupled to additional components, such as display controller 202, small computer system interface (SCSI) controllers, network controllers such as communication controller 206, universal serial bus (USB) controllers, input devices such as a keyboard and mouse, etc. Platform 200 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as communication controller 206 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 200 may be controlled, at least in part, by input from conventional input devices, such as keyboards, mice, touch screens, voice-activated devices, gesture-activated devices, etc., and/or by commands received from another machine, biometric feedback, or other input sources or signals. Platform 200 may utilize one or more connections to one or more remote data processing systems (not shown), such as through communication controller 206, a modem, or other communication ports or couplings.

Platform 200 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Figure 3:
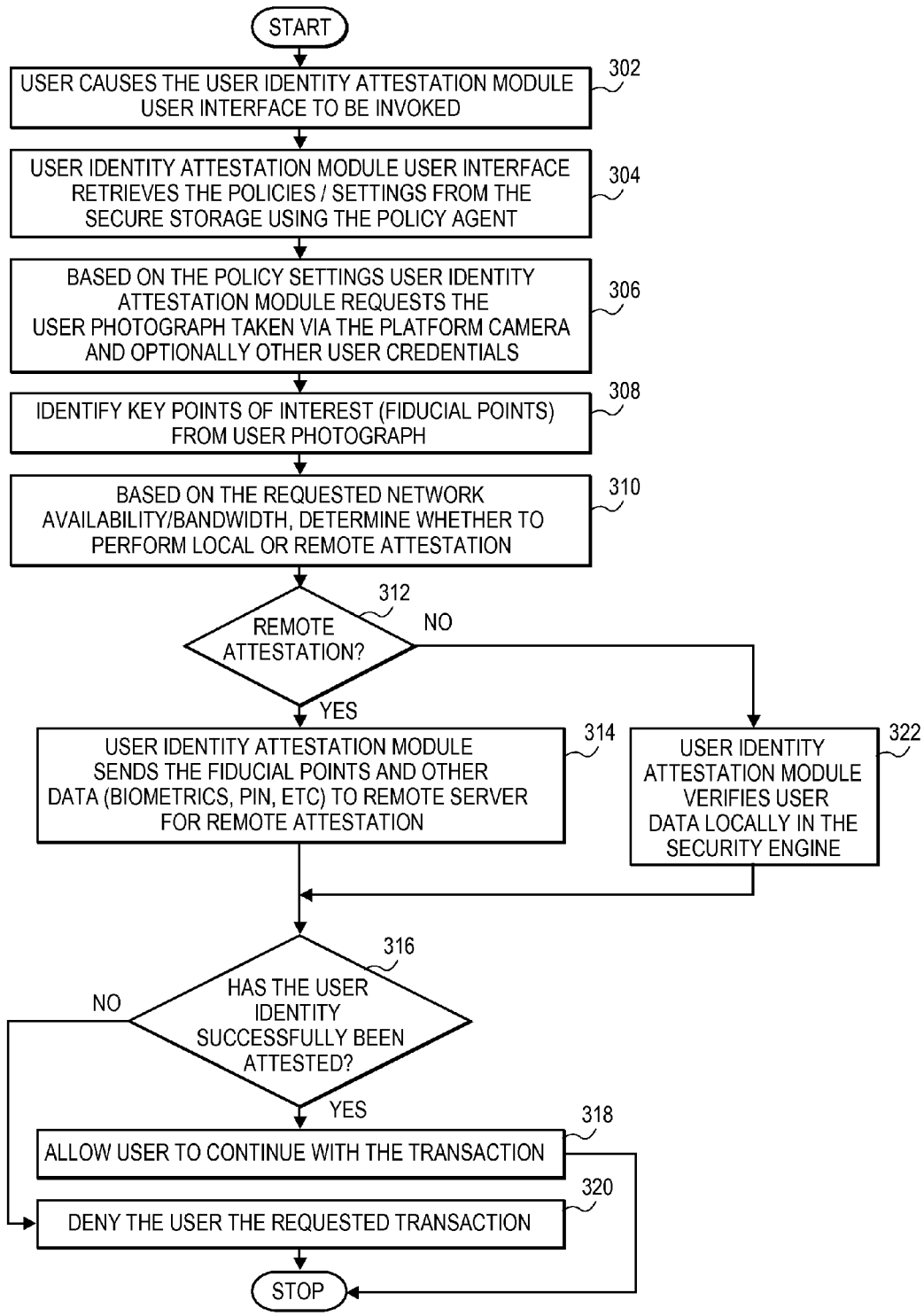
FIG. 3 is a flowchart of a method for performing user identity attestation in accordance with one embodiment of the invention.

FIG. 3 is a flowchart of a method for performing user identity attestation in accordance with one embodiment of the invention. The method steps of FIG. 3 will be described as being performed by components of the system of FIGS. 1 and 2. The method begins in "User Causes the User Identity Attestation Module User Interface to be Invoked" step 302, where a user of the mobile device causes the user identity attestation module user interface 212 to be invoked so that the user can provide credentials. In one embodiment, the user of the mobile device chooses to run the user identity attestation module user interface 212 application. In another embodiment, master authentication agent 241 recognizes the need for user identity attestation and causes the user identity attestation module user interface 212 to appear in response to other user interactions with the mobile device, such as a request to log in or to initiate a transaction.

Control proceeds from "User Causes the User Identity Attestation Module User Interface to be Invoked" step 302 to "User Identity Attestation Module User Interface Retrieves the Policies/Settings from Secure Storage using the Policy Agent" step 304. In step 304, master authentication agent 241 invokes policy storage/enforcement agent 242 to retrieve policies and/or settings for user identity attestation from secure storage 232. Control then proceeds to "Based on the Policy Settings, User Identity Attestation Module Requests the User Photograph Taken via the Platform Camera and Optionally Other User Credentials" step 306. In step 306, master authentication agent 241 interacts with policy storage/ enforcement agent 242 to analyze the policy settings and directs user identity attestation based upon the policy settings for the type of transaction requested by the user. The user identity attestation module 240 requests a user photograph taken via the integrated platform camera by invoking Camera/Biometrics/PIN agent 244. In addition, if the request is a high-security transaction such as a request to transfer money from a bank account, credentials in addition to a user photograph may be required by the bank service provider. These other user credentials may be used to compute a hash function that is used to uniquely identify the user during the user identity attestation process.

Control proceeds from "Based on the Policy Settings, User Identity Attestation Module Requests the User Photograph Taken via the Platform Camera and Optionally Other User Credentials" step 306 to "Identify Key Points of Interest (Fiducial Points) from User Photograph" step 308. Camera/Biometrics/PIN agent 244 identifies the fiducial points from the user photograph. A fiducial point is an object used in the field of view of an imaging system which appears in the image produced, for use as a point of reference or a measure. A fiducial point may be either something placed into or on the imaging subject, or a mark or set of marks in the reticle of an optical instrument. In today's cameras, a physical crosshair representing the center of the camera lens may be replaced by a computer-generated image superimposed on the resulting photograph. Facial recognition technology may then be used to identify characteristics of facial features, such as a relative distance between the eyes when compared to the distance across the face. Fiducial points may also include three-dimensional values, such as the depth of the nose, to avoid false identification in a situation where a malicious user presents a photograph of the owner in front of the camera. A baseline set of fiducial points representing the user is stored in secure storage 232 for comparison with a set of fiducial points identified in the photograph taken in response to a user transaction at "Based on the Policy Settings, User Identity Attestation Module Requests the User Photograph Taken via the Platform Camera and Optionally Other User Credentials" step 306.

From "Identify Key Points of Interest (Fiducial Points) from User Photograph" step 308, control proceeds to "Based on the Requested Network Availability/Bandwidth, Determine whether to Perform Local or Remote Attestation" step 310. The decision whether to perform local or remote attestation may be policy based and can be enforced by the OEM/service provider of the mobile device based on the type of transaction. In one embodiment, the availability and/or bandwidth of the network pertaining to the user's request is evaluated to determine whether to perform local or remote attestation. For example, if the network is unavailable, local attestation may be performed. If the network is available and has sufficient bandwidth to support sending the identified set of fiducial points to a remote server, then remote attestation may be performed.

After a determination whether to perform local or remote attestation at step 310, control proceeds to "Remote Attestation?" decision point 312. If a decision was made to perform remote attestation, control proceeds to "User Identity Attestation Module Sends the Fiducial Points and Other Data (Biometrics, PIN, etc.) to Remote Server for Remote Attestation" step 314. If a decision was made to perform local attestation, control proceeds to "User Identity Attestation Module Verifies User Data Locally in the Security Engine" step 322.

During attestation, rather than performing a pixel-by-pixel comparison of the user photograph taken at step 306 to confirm the user's identity, the identified set of fiducial points from the photograph taken at step 306 is compared with the baseline set of fiducial points for the user to determine whether the two sets of fiducial points match. The two sets of fiducial points are considered to match if a given percentage, such as 98%, of the sets of fiducial points can be considered to have been calculated from images of the same person. Some margin of error is allowed for differences in lighting, camera angle, and other such parameters. The margin of error percentage may be determined by policies established by the OEM/service provider of the mobile device based on the user location, type of transaction requested, and other such parameters.

In one embodiment, the baseline set of fiducial points for an authorized user is a shared secret between the mobile device and the remote server performing remote attestation.

After user identity attestation has been performed, control proceeds from step 314 or step 322 to "Has the User Identity Successfully Been Attested?" decision point 316. If the user identity was successfully attested, control proceeds to "Allow User to Continue with the Transaction" step 318 where the user is allowed to proceed with the transaction. If the user identity was not successfully attested, control proceeds to "Deny the User the Requested Transaction" step 320 where the user is denied continuing with the transaction.

The techniques described for user identity attestation herein provide several advantages when compared to traditional remote attestation methods. Using facial recognition technology to identify the user improves both the security and the performance of the mobile device. By storing a baseline set of fiducial points for each authorized user as a shared secret between the mobile device and a remote server, facial recognition can be used for user identity attestation. Because the technique performs facial recognition by comparing only a limited number of fiducial points, fewer computational resources are needed than with a pixel-by-pixel comparison of images. With the communication of fewer data points between the mobile device and a remote server, fewer handshaking steps are involved and power/performance of the user identity attestation process is improved.

The user identity attestation module described herein is configurable and combines facial recognition technology with other types of user identity attestation technologies, such as biometric data, passwords, and PINs. For example, a hash of a biometric fingerprint can be combined with the fiducial points from the user photograph to perform user identity attestation. Because the user identity attestation module is driven by policy settings, different levels of security can be required for different types of transactions. These levels of security can determine the user identity attestation parameters as well as whether remote or local attestation is to be performed.

In addition, the user identity attestation module described herein operates in a secure environment isolated from an operating system for the mobile device. This ensures that user identity attestation data is not accessible to untrusted parties, including the user, operating system, host applications, and malware. Policy settings and transaction logs are stored in the tamper-proof secure storage as well.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for performing user identity attestation in mobile commerce. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
   receiving, by a security chipset of a mobile device, a user request to access a resource, wherein the security chipset operates independently of a main processor the mobile device and provides a secure storage and a secure environment inaccessible by a host operating system of the mobile device;
   retrieving, by the security chipset, a user attestation policy from the secure storage of the mobile device in response to receiving the user request, wherein the user attestation policy includes a plurality of resources and an indication, for each resource of the plurality of resources, of (i) whether access to the resource requires fiducial point attestation and (ii) whether fiducial point attestation is to be performed locally or remotely if access to the resource requires fiducial point attestation, wherein each indication is defined by a service provider of the resource or a user of the mobile device;
   comparing, by the security chipset, the requested resource to the user attestation policy to determine (i) whether access to the resource requires fiducial point attestation and (ii) whether fiducial point attestation is to be performed locally or remotely if access to the resource requires fiducial point attestation;
   capturing a photograph of a user of the mobile device with a camera integrated with the mobile device in response to determining access to the resource requires fiducial point attestation;
   identifying, by the security chipset, a first set of fiducial points from the photograph;
   transmitting, in response to determining access to the resource requires fiducial point attestation to be performed remotely, the first set of fiducial points to a remote attestation server through an out-of-band communication channel established between the security chipset and the remote attestation server;
   comparing, by the security chipset and in response to determining access to the resource requires fiducial point attestation to be performed locally and based on the user attestation policy, the first set of fiducial points to a second set of fiducial points stored in the secure storage and associated with an authorized user of the mobile device; and authorizing, by the security chipset, the user to access the resource that requires fiducial point attestation if either the first set of fiducial points matches the second set of fiducial points or the remote attestation server indicates that the first set of fiducial points matches a corresponding second set of fiducial points stored on the remote attestation server.

2. The method of claim 1, wherein the second set of fiducial points is a shared secret between secure storage on the mobile device and the remote attestation server.

3. The method of claim 1, further comprising obtaining, by the security chipset, first biometric data from the user of the mobile device,
wherein authorizing the user to access the resource further comprises determining that the first biometric data from the user matches second biometric data associated with the authorized user of the mobile device.

4. The method of claim 1, wherein to determine whether fiducial point attestation is to be performed locally or remotely further comprises to determine whether the out-of-band channel has sufficient bandwidth to transmit the first set of fiducial points to the remote attestation server.

5. The method of claim 1, further comprising accessing, by the host operating system of the mobile device, the requested resource if the user is determined to be authorized to access the requested resource.

6. The method of claim 1, further comprising denying the user request if the user is determined not to be authorized to access the requested resource.

7. A system comprising:
a camera;
a main processor; and
a security chipset, different from the main processor, to operate independently of the main processor and to provide a secure storage and a secure environment inaccessible by a host operating system of the system, the security chipset to:
receive a user request to access a resource;
retrieve a user attestation policy from the secure storage in response to receiving the user request, wherein the user attestation policy includes a plurality of resources and an indication, for each resource of the plurality of resources, of (i) whether access to the resource requires fiducial point attestation and (ii) whether fiducial point attestation is to be performed locally or remotely if access to the resource requires fiducial point attestation, wherein each indication is defined by a service provider of the resource or a user of the system;
compare the requested resource to the user attestation policy to determine (i) whether access to the resource requires fiducial point attestation and (ii) whether fiducial point attestation is to be performed locally or remotely if access to the resource requires fiducial point attestation;
capture a photograph of a user of the system with the camera in response to a determination that access to the resource requires fiducial point attestation;
identify a first set of fiducial points from the photograph;
transmit, in response to a determination that access to the resource requires fiducial point attestation to be performed remotely, the first set of fiducial points to a remote attestation server through an out-of-band communication channel established between the security chipset and the remote attestation server;

compare, in response to a determination that access to the resource requires fiducial point attestation to be performed locally and based on the user attestation policy, the first set of fiducial points to a second set of fiducial points stored in the secure storage and associated with an authorized user of the system; and
authorize the user to access the resource that requires fiducial point attestation if either the first set of fiducial points matches the second set of fiducial points or the remote attestation server indicates that the first set of fiducial points matches a corresponding second set of fiducial points stored on the remote attestation server.

8. The system of claim 7, wherein the second set of fiducial points is a shared secret between secure storage on the system and the remote attestation server.

9. The system of claim 7, wherein the security chipset is further to obtain first biometric data from the user of the system,
wherein to authorize the user to access the resource further comprises to determine that the first biometric data from the user matches second biometric data associated with the authorized user of the system.

10. The system of claim 7, wherein to determine whether fiducial point attestation is to be performed locally or remotely further comprises to determine whether the out-of-band channel has sufficient bandwidth to transmit the first set of fiducial points to the remote attestation server.

11. The system of claim 7, wherein the host operating system of the main processor is to access the requested resource if the user is determined to be authorized to access the requested resource.

12. The system of claim 7, wherein the security chipset is further to deny the user request if the user is determined not to be authorized to access the requested resource.

13. A computer program product comprising:
a non-transitory computer-readable storage medium; and
instructions in the non-transitory computer-readable storage medium, wherein the instructions, when executed in a processing system, cause the processing system to perform operations comprising:
receiving, by a security chipset of the processing system, a user request to access a resource, wherein the security chipset operates independently of a main processor the processing system and provides a secure storage and a secure environment inaccessible by a host operating system of the processing system;
retrieving, by the security chipset, a user attestation policy from the secure storage of the processing system in response to receiving the user request, wherein the user attestation policy includes a plurality of resources and an indication, for each resource of the plurality of resources, of (i) whether access to the resource requires fiducial point attestation and (ii) whether fiducial point attestation is to be performed locally or remotely if access to the resource requires fiducial point attestation, wherein each indication is defined by a service provider of the resource or a user of the processing system;
comparing, by the security chipset, the requested resource to the user attestation policy to determine (i) whether access to the resource requires fiducial point attestation and (ii) whether fiducial point attestation is to be performed locally or remotely if access to the resource requires fiducial point attestation;
capturing a photograph of a user of the processing system with a camera integrated with the processing system in response to determining access to the resource requires fiducial point attestation;

identifying, by the security chipset, a first set of fiducial points from the photograph;

transmitting, in response to determining access to the resource requires fiducial point attestation to be performed remotely, the first set of fiducial points to a remote attestation server through an out-of-band communication channel established between the security chipset and the remote attestation server;

comparing, by the security chipset and in response to determining access to the resource requires fiducial point attestation to be performed locally and based on the user attestation policy, the first set of fiducial points to a second set of fiducial points stored in the secure storage and associated with an authorized user of the processing system; and authorizing, by the security chipset, the user to access the resource that requires fiducial point attestation if either the first set of fiducial points matches the second set of fiducial points or the remote attestation server indicates that the first set of fiducial points matches a corresponding second set of fiducial points stored on the remote attestation server.

14. The computer program product of claim 13, wherein the second set of fiducial points is a shared secret between secure storage on the processing system and the remote attestation server.

15. The computer program product of claim 13, wherein the instructions further cause the processing system to perform operations comprising obtaining, by the security chipset, first biometric data from the user of the processing system,
wherein authorizing the user to access the resource further comprises determining that the first biometric data from the user matches second biometric data associated with the authorized user of the processing system.

16. The computer program product of claim 13, wherein to determine whether fiducial point attestation is to be performed locally or remotely further comprises to determine whether the out-of-band channel has sufficient bandwidth to transmit the first set of fiducial points to the remote attestation server.

17. The computer program product of claim 13, wherein the instructions further cause the processing system to perform operations comprising accessing, by the host operating system of the processing system, the requested resource if the user is determined to be authorized to access the resource.

18. The computer program product of claim 13, wherein the instructions further cause the processing system to perform operations comprising denying the user request if the user is determined not to be authorized to access the resource.

19. The computer-implemented method of claim 1, wherein the user attestation policy includes a further indication, for each resource of the plurality of resources, of a margin of error permitted to consider the first set of fiducial points and the second set of fiducial points to be a match.

20. The computer-implemented method of claim 1, wherein the user attestation policy includes a further indication, for each resource of the plurality of resources, of one or more locations at which the user may access the requested resource such that the user may access the requested resource only if the mobile device is currently at one of the one or more locations.

21. The system of claim 7, wherein the user attestation policy includes a further indication, for each resource of the plurality of resources, of a margin of error permitted to consider the first set of fiducial points and the second set of fiducial points to be a match.

22. The system of claim 7, wherein the user attestation policy includes a further indication, for each resource of the plurality of resources, of one or more locations at which the user may access the requested resource such that the user may access the requested resource only if the system is currently at one of the one or more locations.

23. The computer program product of claim 13, wherein the user attestation policy includes a further indication, for each resource of the plurality of resources, of a margin of error permitted to consider the first set of fiducial points and the second set of fiducial points to be a match.

24. The computer program product of claim 13, wherein the user attestation policy includes a further indication, for each resource of the plurality of resources, of one or more locations at which the user may access the requested resource such that the user may access the requested resource only if the processing system is currently at one of the one or more locations.

* * * * *